(12) United States Patent
Carr

(10) Patent No.: US 8,950,720 B1
(45) Date of Patent: Feb. 10, 2015

(54) PHONE STAND ASSEMBLY

(75) Inventor: Brett J. Carr, Pittsburgh, PA (US)

(73) Assignee: Brett J. Carr, Pittsburgh, PA (US)

( * ) Notice: Subject to any disclaimer, the term of this patent is extended or adjusted under 35 U.S.C. 154(b) by 157 days.

(21) Appl. No.: 13/484,826

(22) Filed: May 31, 2012

(51) Int. Cl.
*A47B 97/04* (2006.01)
*A47G 1/24* (2006.01)

(52) U.S. Cl.
USPC ........................................ 248/460; 248/454

(58) Field of Classification Search
CPC ........ F16M 13/00; F16M 11/10; A47F 5/112; A47B 23/042; A47B 23/043; A47B 23/044; A47B 2220/0019; A47B 2023/049
USPC ............ 248/452–456, 459, 460, 371, 346.06; D14/447; 206/45.21, 45.23, 45.28, 206/45.29, 320; 211/26
See application file for complete search history.

(56) References Cited

U.S. PATENT DOCUMENTS

| | | | | |
|---|---|---|---|---|
| 1,897,305 | A * | 2/1933 | Doherty | 248/459 |
| 2,726,835 | A * | 12/1955 | Hummel | 248/459 |
| 2,784,929 | A | 3/1957 | Diening | |
| 3,119,194 | A * | 1/1964 | Ray | 248/459 |
| 3,410,516 | A * | 11/1968 | Criswell | 248/459 |
| 3,447,770 | A * | 6/1969 | Gallamos | 248/453 |
| 3,460,795 | A * | 8/1969 | Olof | 248/452 |
| 4,674,724 | A * | 6/1987 | Gaudet | 248/459 |
| 4,716,670 | A | 1/1988 | Coda | |
| 5,165,649 | A * | 11/1992 | Neumann et al. | 248/459 |
| 5,458,242 | A * | 10/1995 | Baka et al. | 206/488 |
| 6,848,665 | B1 * | 2/2005 | Wu | 248/459 |
| 7,527,235 | B2 * | 5/2009 | Hummel | 248/459 |
| 7,712,719 | B2 | 5/2010 | Derry et al. | |
| 7,861,995 | B2 | 1/2011 | Liou | |
| D638,021 | S | 5/2011 | Derry | |
| 8,100,376 | B2 * | 1/2012 | Ye | 248/454 |
| 2010/0090085 | A1 * | 4/2010 | Corrion | 248/459 |
| 2010/0213331 | A1 * | 8/2010 | Liou | 248/176.3 |
| 2010/0282924 | A1 | 11/2010 | Boies | |
| 2011/0101193 | A1 * | 5/2011 | Ye | 248/397 |
| 2012/0181410 | A1 * | 7/2012 | Ku et al. | 248/453 |
| 2012/0211631 | A1 * | 8/2012 | Lu et al. | 248/371 |
| 2013/0026329 | A1 * | 1/2013 | Lane et al. | 248/459 |
| 2013/0270413 | A1 * | 10/2013 | Wilber et al. | 248/558 |

* cited by examiner

*Primary Examiner* — Patrick Hawn
(74) *Attorney, Agent, or Firm* — Buchanan Ingersoll & Rooney PC

(57) ABSTRACT

A phone stand assembly provides a stand to support a personal phone in a viewable hands free position. An embodiment of the assembly includes a planar member having a back section, a front section, and a base section extending between the back section and the front section. The front section and back sections are pivotally coupled to the base section. The front section is selectively couplable to the back section when the front section and the back section are pivoted relative to the base section. An opening is positioned in the front section. The opening is configured for receiving a phone therein whereby the phone is supported in an upright position.

8 Claims, 4 Drawing Sheets

PHONE STAND ASSEMBLY

BACKGROUND OF THE DISCLOSURE

Field of the Disclosure

The disclosure relates to phone stand devices and more particularly pertains to a new phone stand device for providing a stand to support a personal phone in a viewable hands free position.

SUMMARY OF THE DISCLOSURE

An embodiment of the disclosure meets the needs presented above by generally comprising a planar member having a back section, a front section, and a base section extending between the back section and the front section. The front section and back sections are pivotally coupled to the base section. The front section is selectively couplable to the back section when the front section and the back section are pivoted relative to the base section. An opening is positioned in the front section. The opening is configured for receiving a phone therein whereby the phone is supported in an upright position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
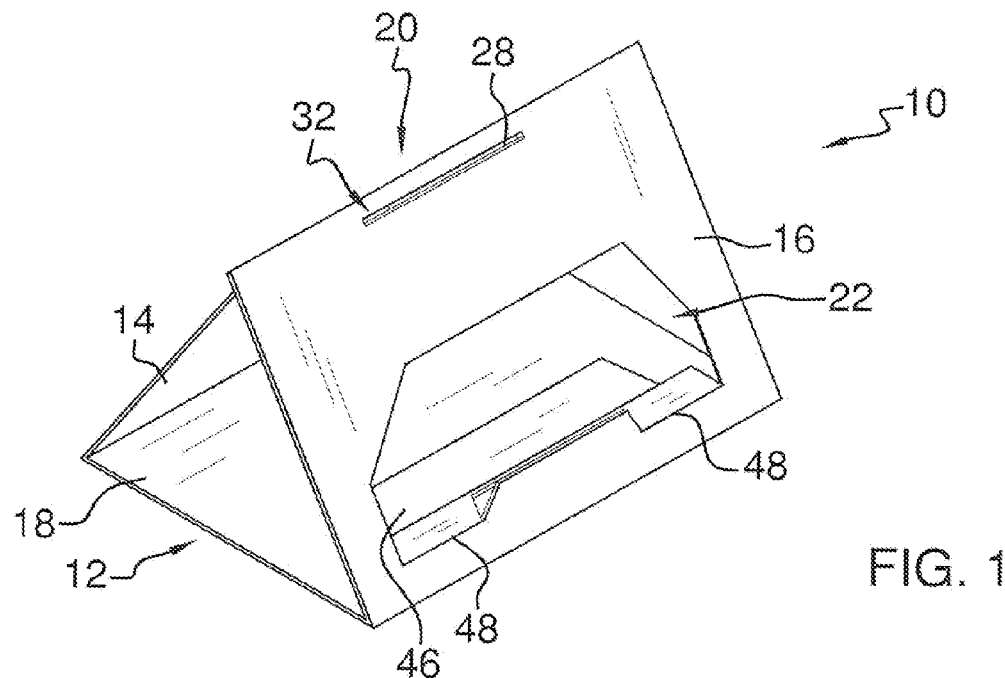
FIG. 1 is a top front side perspective view of a phone stand assembly according to an embodiment of the disclosure.
Figure 2:
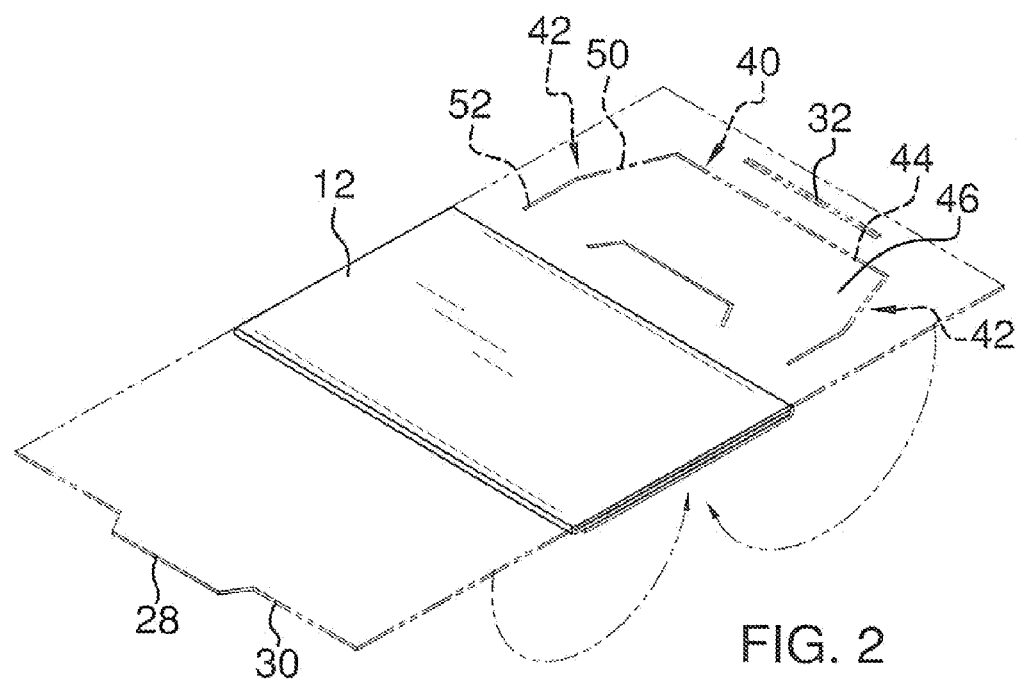
FIG. 2 is a top front side perspective view of an embodiment of the disclosure in a collapsed position.
Figure 3:
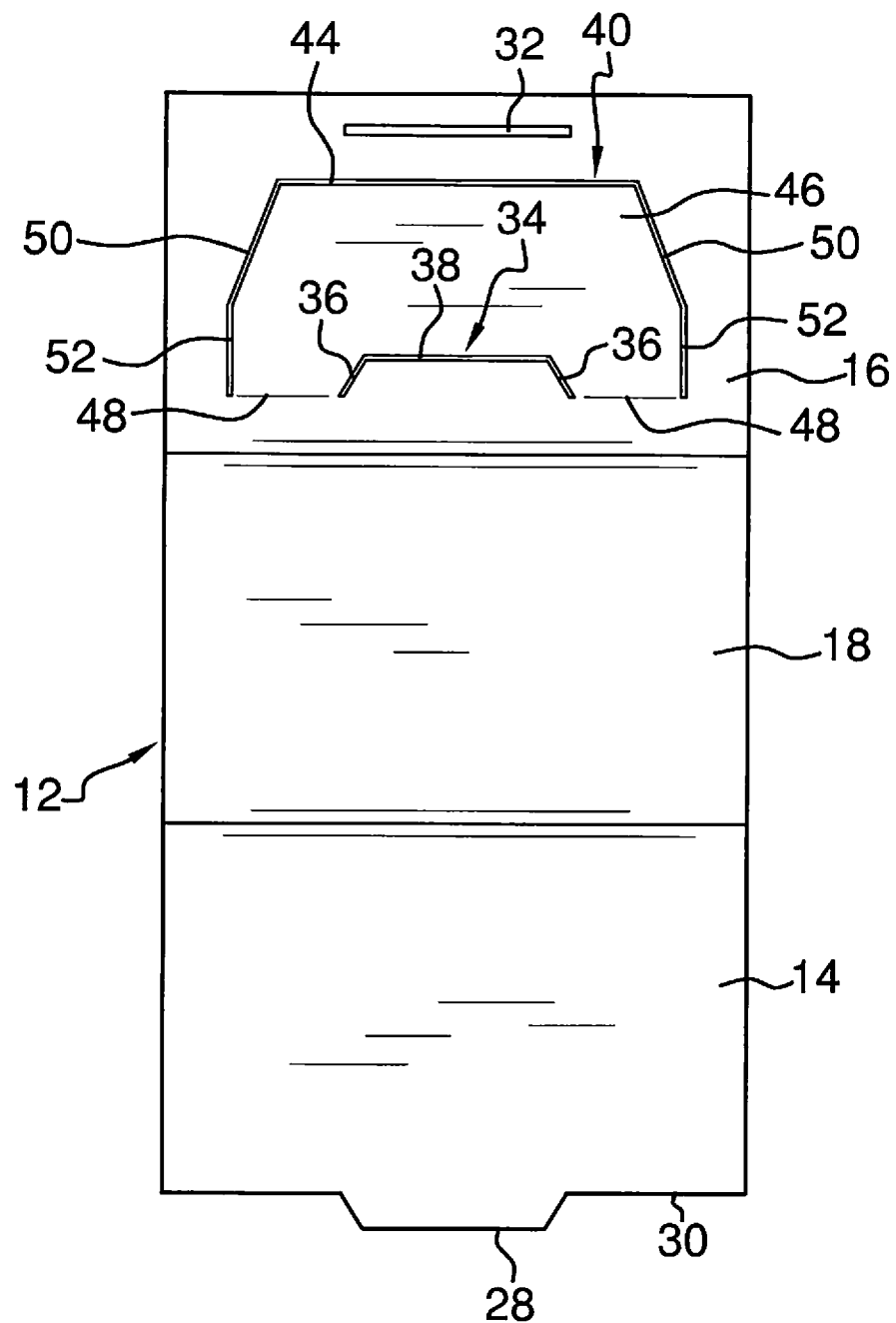
FIG. 3 is a top view of an embodiment of the disclosure.
Figure 4:
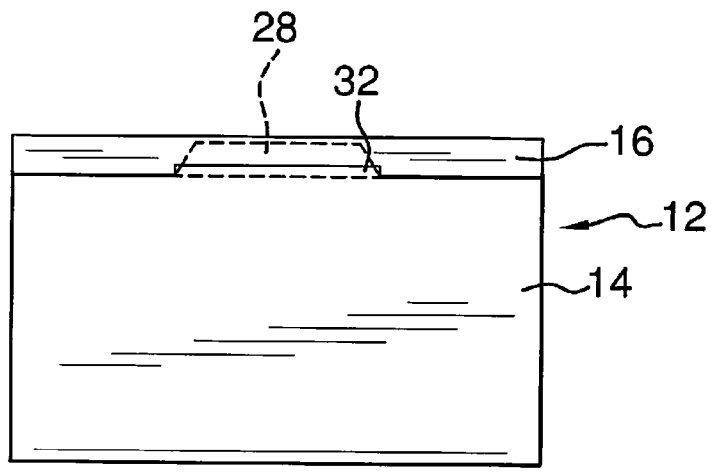
FIG. 4 is a back view of an embodiment of the disclosure.
Figure 5:
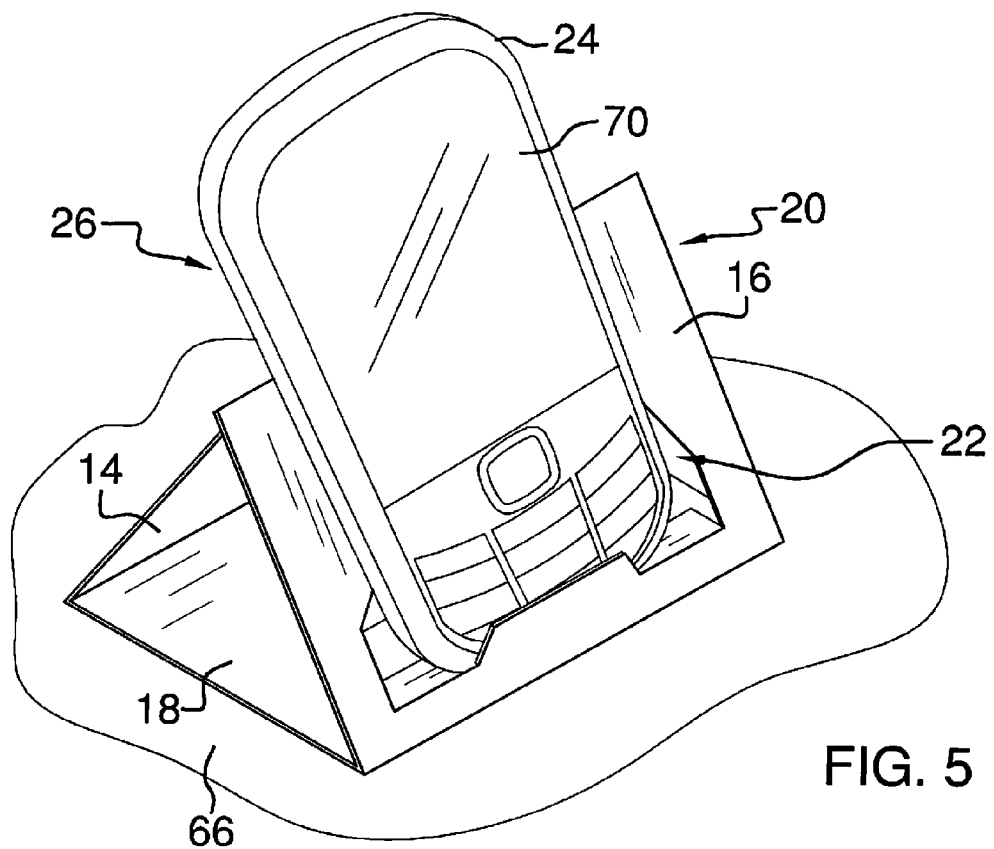
FIG. 5 is a top front side perspective view of an embodiment of the disclosure in use.

With reference now to the drawings, and in particular to FIGS. 1 through 6 thereof, a new phone stand device embodying the principles and concepts of an embodiment of the disclosure and generally designated by the reference numeral 10 will be described.

As best illustrated in FIGS. 1 through 6, the phone stand assembly 10 generally comprises a planar member 12 having a back section 14, a front section 16, and a base section 18 extending between the back section 14 and the front section 16. The front section 16 is pivotally coupled to the base section 18. The back section 14 is also pivotally coupled to the base section 18. The front section 16 is selectively couplable to the back section 14 when the front section 16 and the back section 14 are pivoted relative to the base section 18 to form a stand 20. An opening 22 is positioned in the front section 16. The opening 22 is configured for receiving a phone 24 therein whereby the phone 24 is supported in an upright position 26.

A tab 28 extends from the planar member 12 and may be integrally formed into a free edge 30 of the planar member 12. A corresponding slot 32 is positioned in the planar member 12. The tab 28 engages the slot 32 whereby the back section 14 is coupled to the front section 16. The tab 28 may be positioned on the back section 14 and the slot 32 in the front section 16 or vice versa.

A bottom slit 34 extends through the front section 16. The bottom slit 34 has a pair of outer portions 36 and a central portion 38 extending between the outer portions 36. The outer portions 36 of the bottom slit 34 may extend outwardly and downwardly from the central portion 38. A top slit 40 extends through the front section 16. The top slit has a pair of side portions 42 and a top portion 44 extending between the side portions 42. The top slit 40 is positioned in spaced relationship to the bottom slit 34 defining a pivotable cutout 46 in the front section 16 forming the opening 22. The cutout 46 has pivotable bottom edges 48 extending between the top slit 40 and the bottom slit 34. Each of the side portions 42 of the top slit 40 may have an angle section 50 extending from the top portion 44 and a distal section 52 relative to the top portion 44. The distal section 52 extends from the angle section 50. The top portion 44 of the top slit 40 may be parallel to the central portion 38 of the bottom slit 34.

Figure 6:
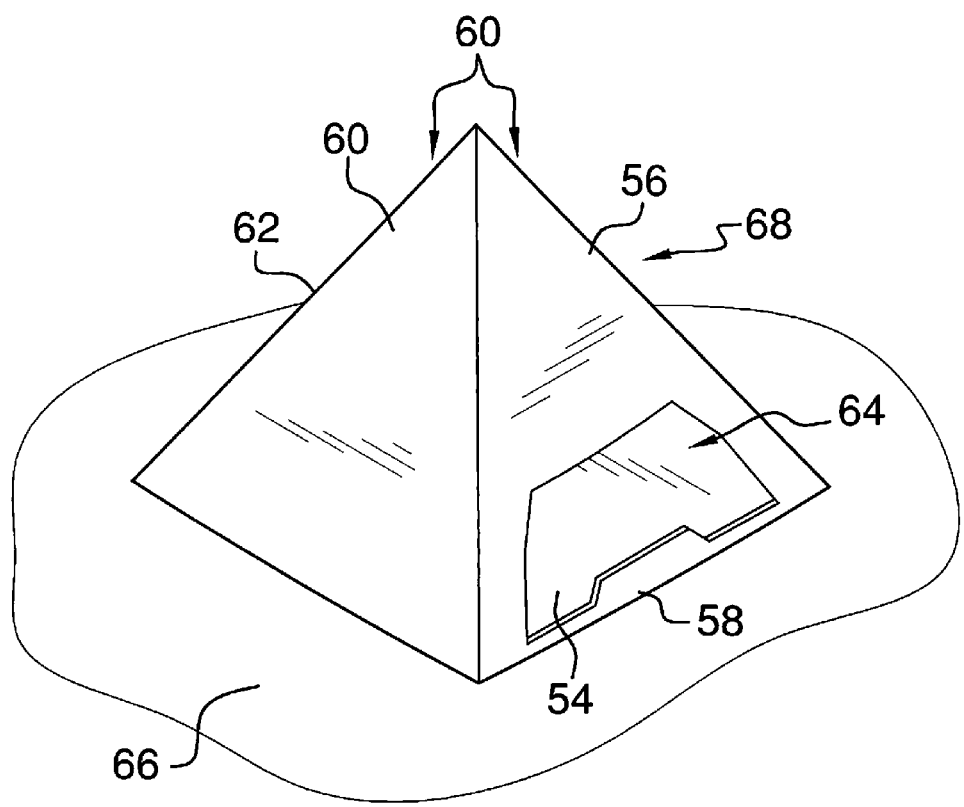
FIG. 6 is a top front side perspective view of an embodiment of the disclosure.

In an alternate embodiment, shown in FIG. 6, a non-collapsible stand 68 may be formed by a bottom panel 54, a front wall 56 coupled to and extending upwardly from a forward edge 58 of the bottom panel 54, and a plurality of side walls 60 coupled to the bottom panel 54 and the front wall 56. The front wall 56 and side walls 60 may form a pyramidal shape 62. An opening 64 extends through the front wall 56. The opening 64 may have a similar shape to the opening 22 described above.

In use, the stand 20 or 68 is positioned on a support surface 66 and the phone 24 is inserted into the opening 22 or 64. A display panel 70 of the phone 24 is supported in a viewable position extending upwardly from the support surface 66 without having to hold the phone 24. The prominent positioning of the phone 24 in the stand 20 or 68 lessens the chance for missed phone calls or leaving the phone 24 behind when leaving the area of the support surface 66.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A phone stand assembly comprising:
   a planar member having a back section, a front section, and a base section extending between said back section and said front section, said front section being pivotally coupled to said base section, said back section being pivotally coupled to said base section, said front section being selectively couplable to said back section when said front section and said back section are pivoted relative to said base section;
   wherein the front section is planar and has an opening positioned in said front section, said opening being defined by a top slit and a bottom slit;
   wherein said opening is configured for receiving a phone therein whereby the phone is supported in an upright position;
   wherein the bottom slit extends through said front section; and
   wherein the top slit extends through said front section, said top slit having a pair of side portions and a top portion extending between said side portions, said top slit being positioned in spaced relationship to said bottom slit, the top slit and the bottom slit defining a pivotable cutout in said front section forming said opening;
   wherein the pivotable cutout is attached to the front section by pivotable bottom edges, the pivotable bottom edges defined by an area extending between the top slit and the bottom slit;
   wherein the pivotable cutout defines a flat section adjacent the pivotable bottom edges when the pivotable cutout is displaced from the front section, the flat section being configured to support a base of the phone when the phone is received in the opening; and
   wherein the bottom slit defines an upwardly extending tab when the pivotable cutout is displaced from the front section via the pivotable bottom edges, the upwardly extending tab being configured to restrict movement of the phone away from the front section when the phone is received in the opening.

2. The assembly of claim 1, further comprising:
   a tab extending from said planar member; and
   a slot positioned in said planar member, said tab engaging said slot whereby said back section is coupled to said front section.

3. The assembly of claim 1, further including said bottom slit having a pair of outer portions and a central portion extending between said outer portions.

4. The assembly of claim 3, further including said outer portions extending outwardly and downwardly from said central portion.

5. The assembly of claim 1, further including each of said side portions of said top slit having an angle section extending from said top portion and a distal section relative to said top portion, said distal section extending from said angle section.

6. The assembly of claim 3, further including said central portion of said bottom slit being parallel to said top portion of said top slit.

7. A phone stand assembly comprising:
   a bottom panel;
   a front wall coupled to and extending upwardly from a forward edge of said bottom panel;
   a plurality of side walls coupled to said bottom panel and said front wall; and
   wherein the front wall is planar and has an opening extending through said front wall, said opening being defined by a top slit and a bottom slit;
   wherein said opening being configured for receiving a phone therein whereby the phone is supported in an upright position;
   wherein the top slit and the bottom slit define a pivotable cutout, such that the opening is present when the pivotable cutout is displaced from the front section;
   wherein the pivotable cutout is attached to the front section by pivotable bottom edges, the pivotable bottom edges defined by an area extending between the top slit and the bottom slit;
   wherein the pivotable cutout defines a flat section adjacent the pivotable bottom edges when the pivotable cutout is displaced from the front section, the flat section being configured to support a base of the phone when the phone is received in the opening; and
   wherein the bottom slit defines an upwardly extending tab when the pivotable cutout is displaced from the front section via the pivotable bottom edges, the upwardly extending tab being configured to restrict movement of the phone away from the front section when the phone is received in the opening.

8. A phone stand assembly comprising:
   a planar member having a back section, a front section, and a base section extending between said back section and said front section, said front section being pivotally coupled to said base section, said back section being pivotally coupled to said base section, said front section being selectively couplable to said back section when said front section and said back section are pivoted relative to said base section;
   wherein the front section is planar and has an opening positioned in said front section, said opening being defined by a top slit and a bottom slit;
   wherein said opening being configured for receiving a phone therein whereby the phone is supported in an upright position;
   wherein the top slit and the bottom slit define a pivotable cutout, such that the opening is present when the pivotable cutout is displaced from the front section;
   wherein the pivotable cutout is attached to the front section by pivotable bottom edges, the pivotable bottom edges defined by an area extending between the top slit and the bottom slit;
   wherein the pivotable cutout defines a flat section adjacent the pivotable bottom edges when the pivotable cutout is displaced from the front section, the flat section configured to support a base of the phone when the phone is received in the opening; and
   wherein the bottom slit defines an upwardly extending tab when the pivotable cutout is displaced from the front section via the pivotable bottom edges, the upwardly extending tab being configured to restrict movement of the phone away from the front section when the phone is received in the opening.

* * * * *